3,660,325
PREPARATION OF TOUGHENED POLYVINYL AROMATIC COMPOUND
Alexander McColl Bremner, Amberley, near Stroud, England, and John Mansel Squire, Dollar, Scotland, assignors to The British Petroleum Company Limited, London, England
No Drawing. Filed Feb. 25, 1970, Ser. No. 14,241
Claims priority, application Great Britain, Mar. 12, 1969, 13,009/69
Int. Cl. C08f *15/40, 19/08*
U.S. Cl. 260—17 R                                5 Claims

---

ABSTRACT OF THE DISCLOSURE

A toughened polyvinyl aromatic compound is made by prepolymerising a solution of rubber and vinyl aromatic monomer until phase inverted and suspending the solution in water using a mixture of hydroxyethyl cellulose and polyvinyl alcohol as suspension stabilisers, Polymerisation is then completed in suspension.

---

This invention relates to the preparation of toughened polyvinyl aromatic compounds. It particularly relates to the incorporation into such polymers of rubbery compounds which increase their impact strength.

Two main general methods exist for making toughened polyvinyl aromatic compounds. One is to blend the rubbery compound and the vinyl aromatic compound polymer physically; the other is to polymerise the monomeric vinyl aromatic compound in the presence of the rubbery compound. This latter method is commonly performed in two stages with the second stage taking place in an aqueous suspension. In the first stage a solution of the rubbery compound in the vinyl aromatic compound is partially polymerised until phase inversion of the monomer/polymer/rubber system can occur. Phase inversion must take place in the first stage before suspension. In the second stage the polymerisation of the vinyl aromatic compound is continued with the monomeric material dispersed throughout an aqueous phase in the form of a stable suspension i.e. a suspension which does not break down during the remaining polymerisation. By phase inversion is meant that the rubbery compound changes from being in solution throughout the polymerising mass to being in the form of discrete droplets of a solution of the rubbery compound in monomeric material dispersed throughout a main phase consisting essentially of a solution of the polyvinyl aromatic compound dissolved in monomeric vinyl aromatic compound. The conditions necessary in the first stage to enable phase inversion to take place either in the first stage or on the formation of the stable suspension for the second stage polymerisation are well known. Essentially they consist in subjecting the first stage polymerising mass to shear forces while allowing the polymerisation to continue until a point is reached at which the phase inversion occurs or can occur on subsequent dispersion. The point at which the phase inversion occurs will depend on the nature of the rubber compound and the vinyl aromatic compound and their relative proportions. Generally when polymerising styrene with normally employed reinforcing rubbers the phase inversion point occurs when the first stage reaction mixture contains from about 10% to 20% of the total vinyl aromatic compound present (monomer+polymer) is in a polymerised state.

In order to form a stable suspension it is necessary to add a suspension stabiliser in the second stage. Hydroxy ethyl cellulose is a well known suspension stabiliser but it has been found that the resulting toughened polyvinyl aromatic polymer tends to occlude water, often in quite substantial quantities. Water occlusion is undesirable for many reasons, one of which is that material containing occluded water cannot be extruded because steam is evolved to a point where the back pressure stops the feed.

The object of the present invention is to provide a polymerisation process for the manufacture of toughened polyvinyl aromatic compound using an improved suspension stabiliser system in the second stage of a two-stage process.

Accordingly the present invention is a process for the production of a toughened polyvinl aromatic compound which comprises a partially polymerising a solution of a reinforcing rubbery compound in a vinyl aromatic compound until phase inversion can occur, allowing phase inversion to take place and forming a stable suspension of the partially polymerised material in water using a mixture of hydroxy ethyl cellulose and polyvinyl alcohol as the suspension stabilising system and allowing the polymerisation of the vinyl aromatic compound to continue.

The first stage partial polymerisation may be carried out under known conditions. Water may be present during the partial polymerisation and, if desired, pre-formed polymer of the vinyl aromatic compound may be added. Suitably the first stage partial polymerisation is carried out on a mix containing the water required for the suspension stage.

The stable suspension of the partially polymerised material is brought about by agitating it, for instance by means of stirrers, with an aqueous phase containing the suspension stabilising system. The suspension polymerisation of the partially polymerised material may then by readily brought about using known suspension polymerisation techniques.

Suitably from 50 to 300 and preferably 80 to 120 parts by wt. of aqueous phase are present per 100 parts by wt. of the partially polymerised material.

The suspension stabilising system used in the process of the present invention comprises a mixture of hydroxyethyl cellulose and polyvinyl alcohol. This system may be premixed or the components may be added separately to the polymerisation system. (It is important not to use too great a quantity of polyvinyl alcohol because this tends to breaks down some of the stable suspension system and convert it into an emulsion polymerisation system. Any emulsion polymer produced may be lost during the recovery of the toughened polymer beads at the end of the process. Suitably the amount of polyvinyl alcohol present is in the range 0.01 to 0.5% by weight on the vinyl aromatic compound. Generally from 0.1 to 0.4% by weight on the vinyl aromatic compound of hydroxyethyl cellulose is used. More can be used if desired for instance up to 1% on the total suspension. The polyvinyl alcohol is suitably added in aqueous solution. It is found to be preferable to add the polyvinyl alcohol to the partially polymerised material shortly before the hydroxy ethyl cellulose. This technique is found to result in further reduced water occulsion.

Any of the known rubbery compounds that have been used in the reinforcement or toughening of vinyl aromatic polymers can be employed in the process of the present invention. Suitable rubbery compounds are polydienes, particularly polybutadienes having a cis-1,4-content greater than 30%. Other suitable rubbery compounds are styrene/butadiene random copolymers, styrene/butadiene block copolymers ethylene/propylene rubbery copolymers and ethylene propylene rubbery terpolymers. Suitable vinyl aromatic compounds include styrene, ortho- and para-monochlorostyrenes, di-chlorostyrenes and vinyl toluene. Mixtures of vinyl aromatic compounds can readily be polymerised according to the process of the present invention. Up to 30% wt. monomers of a polymerisable comonomer such as acrylonitrile may also be added in the first stage.

The polymerisation of the vinyl aromatic compound is suitably initiated both in the first and the second stage of the polymerisation process by means of polymerisation initiators. Suitable initiators for the polymerisation of vinyl aromatic compounds are well known and examples include benzoyl peroxide, di-cumyl peroxide, tertiary butyl perbenzoate, lauroylperoxide, di-tertiary butyl peroxide and 2-azo-bis-isobutyro-nitrile. Mixtures of initiators are often preferred.

Other conventional ingredients of suspension polymerisation systems can be present in the process of the present invention. For example white mineral oil and stearic acid are generally employed in the polymerisation of styrene as lubricant and mould release agent respectively.

The invention is illustrated by the following examples.

EXAMPLE 1

2000 gms. of polybutadiene rubber (intene 45NFA) and 1000 gms. of crystal polystyrene (BP Chemicals KLP grade) were dissolved in a mixture of 53 lbs. styrene and 28 lbs. demineralised water at 194° F. by stirring for one hour in a 12 gallon reactor. Using 2.5 gms. benzoyl peroxide and 12.5 gms. lauroyl peroxide as initiators the mixture was prepolymerised for 2¼ hours at 194° F. 12.5 gms. dicumyl peroxide, 32.5 gms. t.butyl perbenzoate as initiators, 1000 gms. white mineral oil as lubricant, and 12.5 gms. t.dodecyl mercaptan as chain transfer agent were dispersed by stirring for 15 minutes at 194° F.

The prepolymer solution was then suspended by adding 75 gms. of hydroxy ethyl cellulose (Natrosol 250 HR) (0.3% on weight of styrene) and 28 lbs. demineralised water. The temperature was raised to 248° F. in 45 mins., maintained at 248° F. for 2 hours, raised to 284° F. in 2 hours, and maintained at 284° F. for 2 hours.

A weight yield of 108.5% yield was obtained but the pellets contained so much water (ca. 10%) that they could not be extruded.

EXAMPLE 2

Example 1 was repeated using 0.1% of polyvinyl alcohol (25 gms. dissolved in 300 cc. water) as suspending agent instead of hydroxy ethyl cellulose. A 94% yield of polymer was obtained; the loss of polymer as fines due to envision polymerisation being 6%.

EXAMPLE 3

Example 1 was repeated using 0.025% of polyvinyl alcohol (6.25 gms. dissolved in 75 cc. water) to initiate suspension followed by 0.15% of hydroxy ethyl cellulose (37.5 gms.). A 96.6% yield was obtained, 0.6% of which was occluded water.

We claim:

1. In a two-stage polymerisation process for the production of a toughened polyvinyl aromatic compound which comprises the steps of polymerising a solution of a reinforcing rubber compound selected from the group consisting of polydienes, styrene/butadiene random copolymers and ethylene/propylene rubbery copolymers in a vinyl aromatic compound selected from the group consisting of styrene, ortho monochlorostyrene, para monochlorostyrene, dichlorostyrene and vinyl toluene until phase inversion occurs, allowing phase inversion to take place, forming a stable suspension of the partially polymerised material in water and completing polymerisation of the vinyl aromatic compound; the improvement which comprises using a mixture of hydroxy ethyl cellulose and polyvinyl alcohol as a stabilizer in forming said stable suspension in amounts to provide 0.1% to 0.4% and 0.01% to 0.5% by weight of said vinyl aromatic compound respectively and wherein said polyvinyl alcohol is added prior to addition of hydroxy ethyl cellulose.

2. Process according to claim 1 where the partially polymerised material is suspended in from 50 to 300 parts by weight per 100 parts of the partially polymerised material.

3. Process according to claim 2 where from 80 to 120 parts water are used.

4. Process according to claim 1 where the rubber compound is a polybutadiene having a cis-1,4-content greater than 30%.

5. Process according to claim 1 where the initiators for both stages of the polymerisation reaction are selected from the group consisting of benzoyl peroxide, di-cumyl-peroxide, t-butyl perbenzoate, lauroyl peroxide, di-t-butyl peroxide and 2-azo-bis isobutyro nitrile.

References Cited

UNITED STATES PATENTS

| | | | |
|---|---|---|---|
| 3,222,343 | 12/1965 | Ingram et al. | 260—93.5 |
| 3,309,422 | 3/1967 | Doak et al. | 260—880 |
| 3,346,520 | 10/1967 | Lee | 260—17 |
| 3,444,270 | 5/1969 | Aliberti et al. | 260—878 |
| 3,487,127 | 12/1969 | Erchak et al. | 260—876 |

WILLIAM H. SHORT, Primary Examiner

L. M. PHYNES, Assistant Examiner

U.S. Cl. X.R.

260—880